(12) United States Patent
Omino et al.

(10) Patent No.: US 9,984,239 B2
(45) Date of Patent: May 29, 2018

(54) CONCEALING APPARATUS, DECODING APPARATUS, CONCEALING METHOD, AND DECODING METHOD

(71) Applicant: KABUSHIKI KAISHA TOSHIBA, Tokyo (JP)

(72) Inventors: Tsukasa Omino, Tokyo (JP); Yuichi Komano, Kanagawa (JP); Kazuo Ohta, Tokyo (JP); Mitsugu Iwamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 161 days.

(21) Appl. No.: 15/058,815

(22) Filed: Mar. 2, 2016

(65) Prior Publication Data
US 2016/0314305 A1 Oct. 27, 2016

(30) Foreign Application Priority Data
Apr. 27, 2015 (JP) ................. 2015-090867

(51) Int. Cl.
| H04L 29/06 | (2006.01) |
| G06F 21/60 | (2013.01) |
| H04L 9/08 | (2006.01) |
| G06F 21/62 | (2013.01) |

(52) U.S. Cl.
CPC ........ G06F 21/602 (2013.01); G06F 21/6227 (2013.01); H04L 9/0866 (2013.01); G06F 2221/2107 (2013.01)

(58) Field of Classification Search
CPC ... G06F 21/602; G06F 21/6227; H04L 9/0866

USPC ........................................... 713/189
See application file for complete search history.

(56) References Cited

U.S. PATENT DOCUMENTS

| 9,342,705 B1* | 5/2016 | Schneider ................ H04L 9/14 |
| 2008/0059414 A1 | 3/2008 | Cristofor et al. |
| 2009/0300351 A1* | 12/2009 | Lei .................... G06F 17/30864 |
| | | 713/165 |
| 2010/0169321 A1 | 7/2010 | Wang et al. |
| 2011/0004607 A1* | 1/2011 | Lokam ............. G06F 17/30675 |
| | | 707/759 |
| 2011/0280404 A1* | 11/2011 | Jennas, II ............ H04L 9/0827 |
| | | 380/278 |

(Continued)

FOREIGN PATENT DOCUMENTS

| JP | 2004-145755 | 5/2004 |
| JP | 2006-33895 | 2/2006 |

(Continued)

*Primary Examiner* — Michael S McNally
(74) *Attorney, Agent, or Firm* — Finnegan, Henderson, Farabow, Garrett & Dunner, L.L.P.

(57) ABSTRACT

According to an embodiment, a concealing apparatus includes a concealing processor, a mapping information generator, a tag generator, and a concealed, information output unit. The concealing processor is configured to generate a concealed text by concealing a plaintext with a concealing key. The mapping information generator is configured to generate mapping information that is mapped to a keyword for retrieving the plaintext. The tag generator is configured to generate a tag based on the keyword and the mapping information. The concealed information output unit is configured to output the concealed text and the tag as a pair.

21 Claims, 16 Drawing Sheets

(56) References Cited

U.S. PATENT DOCUMENTS

| | | | |
|---|---|---|---|
| 2012/0297201 A1* | 11/2012 | Matsuda | G06F 21/6245 |
| | | | 713/189 |
| 2014/0122900 A1* | 5/2014 | Kaushik | G06F 17/30424 |
| | | | 713/189 |
| 2014/0294176 A1 | 10/2014 | Endo et al. | |
| 2015/0016606 A1 | 1/2015 | Omino et al. | |
| 2015/0039903 A1* | 2/2015 | Cash | G06F 21/602 |
| | | | 713/189 |
| 2016/0210443 A1* | 7/2016 | Arngren | H04L 9/0822 |
| 2016/0366113 A1* | 12/2016 | Dawoud | H04L 63/0471 |

FOREIGN PATENT DOCUMENTS

| | | |
|---|---|---|
| JP | 2007-318518 | 12/2007 |
| JP | 2010-503118 | 1/2010 |
| JP | 2010-211786 | 9/2010 |
| JP | 2012-73693 | 4/2012 |
| JP | 2012-79192 | 4/2012 |
| JP | 2014-192612 | 10/2014 |
| JP | 2015-19333 | 1/2015 |

\* cited by examiner

FIG.5

| KEYWORD | MAPPING INFORMATION |
|---|---|
| w1 | r1 |
| w2 | r2 |
| w1 | r3 |
| w2 | r4 |
| w2 | r5 |
| ⋮ | ⋮ |

FIG.6

| KEYWORD | MAPPING INFORMATION |
|---|---|
| w1 | r1, r3 |
| w2 | r2, r4, r5 |
| ⋮ | ⋮ |

US 9,984,239 B2

CONCEALING APPARATUS, DECODING APPARATUS, CONCEALING METHOD, AND DECODING METHOD

CROSS-REFERENCE TO RELATED APPLICATION

This application is based upon and claims the benefit of priority from Japanese Patent Application No. 2015-090867, filed on Apr. 27, 2015; the entire contents of which are incorporated herein by reference.

FIELD

Embodiments described herein relate generally to a concealing apparatus, a decoding apparatus, a concealing method, and a decoding method.

BACKGROUND

Known as a method allowing a target encrypted, piece of information to be retrieved from pieces of encrypted information is a method of appending additional information for retrieval (a tag) to each of the pieces of encrypted information. By generating a tag from, a keyword used by a user to retrieve a piece of information, this method allows the piece of encrypted information appended with a tag that matches the generated tag to be acquired. In this manner, target information can be retrieved without decoding the encrypted information.

If the target information is retrieved frequently, however, the security may deteriorate, because frequent retrieval may permit the content of the plaintext, to be inferred from the tags, or may lead to the leakage of information such as the retrieval frequencies of the plaintext. To improve the security of such a method, it is necessary to increase the size of the encryption key size and the tag size. When the encryption key size and the tag size are increased, however, the amount of information required for a retriever to own in order to retrieve a piece of information is increased as well.

BRIEF DESCRIPTION OF THE DRAWINGS

FIG. 5 is a schematic illustrating a first example of a mapping relation between a keyword and mapping information;
FIG. 6 is a schematic illustrating a second example of the mapping relation between a keyword and mapping information.

DETAILED DESCRIPTION

According to an embodiment, a concealing apparatus includes a concealing processor, a mapping information generator, a tag generator, and a concealed information output unit. The concealing processor is configured to generate a concealed text by concealing a plaintext with a concealing key. The mapping information generator is configured to generate mapping information that is mapped to a keyword for retrieving the plaintext. The tag generator is configured to generate a tag based on the keyword, and the mapping information. The concealed information output unit is configured to output the concealed text and the tag as a pair.

Exemplary embodiments will now be described in detail with reference to the accompanying drawings. Retrieval systems according to the embodiments are intended to improve the security of concealed texts and tags, while reducing the amount of information to be retained, to allow a target piece of information to be retrieved.

First Embodiment

Figure 1:
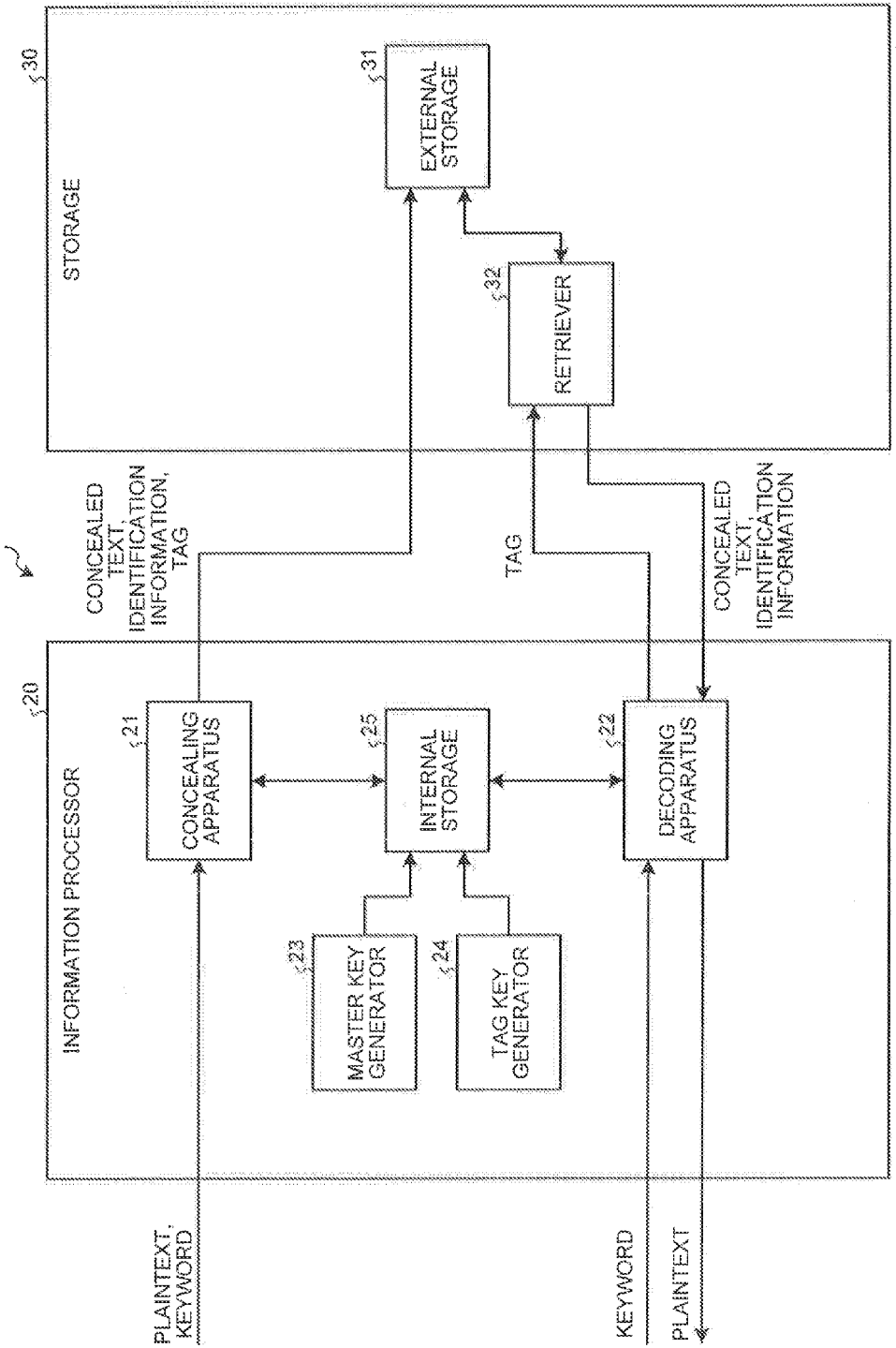
FIG. 1 is a schematic illustrating a configuration of a retrieval system according to a first embodiment.

FIG. 1 is a schematic illustrating a configuration of a retrieval system 10 according to a first embodiment. The retrieval system 10 includes an information processor 20 and a storage 30.

The information processor 20 includes a concealing apparatus 21, a decoding apparatus 22, a master key generator 23, a tag key generator 24, and an internal storage 25. The storage 30 includes an external storage 31 and a retriever 32.

The concealing apparatus 21, the decoding apparatus 22, the master key generator 23, the tag key generator 24, and the internal storage 25 are connected to an internal network to which only specific privileged users are permitted to access. In other words, the specific privileged users, but not the users other than the specific privileged users, are permitted to access the concealing apparatus 21, the decoding apparatus 22, the master key generator 23, the tag key generator 24, and the internal storage 25. The concealing apparatus 21, the decoding apparatus 22, the master key generator 23, the tag key generator 24, and the internal storage 25 may be implemented on one computer, or on a plurality of different computers.

The external storage 31 and the retriever 32 are connected to an external network to which the users other than the specific users are permitted to access. In other words, the users other than the specific users who are permitted to access the internal storage 25 and the like are permitted to access the external storage 31 and the retriever 32. The storage 30 may be implemented on a computer, or a server or a cloud service system in the Internet, for example.

The concealing apparatus 21 receives an input of a plaintext and at least one keyword allowing the plaintext, to be retrieved. The concealing apparatus 21 generates a concealed text resulting from the concealing of the received plaintext with a concealing key, and identification information for identifying the received plaintext. The concealing apparatus 21 also generates mapping information corresponding to each of the received keywords. The concealing apparatus 21 also generates a tag (additional information) for each of the received keywords, based on the keyword and the corresponding mapping information.

The concealing apparatus 21 then outputs the generated concealed text, identification information, and at least one tag as a set, to the external storage 31. The external storage 31 receives the concealed text, identification information, and at least one tag that are input as a set, from the concealing apparatus 21, and stores therein the set. The external storage 31 stores therein a plurality of concealed texts as respective sets each includes corresponding piece of identification information and at least one tag.

The concealing apparatus 21 outputs the keyword and the mapping information corresponding to the keyword as a pair to the internal storage 25. The internal storage 25 receives the keyword and the mapping information corresponding to the keyword that are output as a pair from the concealing apparatus 21, and stores therein the pair. The internal storage 25 stores therein a plurality of keywords each of which is paired with a corresponding piece of mapping information.

The decoding apparatus 22 receives an input of a keyword for retrieving a plaintext. The decoding apparatus 22 then acquires the mapping information stored in a manner mapped to the received keyword from the internal storage 25. The decoding apparatus 22 then generates a tag based on the received keyword and the acquired mapping information. The decoding apparatus 22 then outputs the generated tag to the retriever 32. The retriever 32 receives the tag from the decoding apparatus 22, and accesses the external storage 31. The retriever 32 then retrieves a plurality of concealed texts and pieces of identification information that are included in the same sets with the received tag. Once the concealed texts and the identification information included in the same sets as the received tag are extracted from the external storage 31, the retriever 32 outputs the concealed texts and the identification information belonging to the respective extracted sets, as pairs to the decoding apparatus 22.

The decoding apparatus 22 receives an input of the concealed texts and the identification information output as pairs from the retriever 32. The decoding apparatus 22 then decodes the plaintext from each of the concealed texts included in the respective pairs, using the corresponding concealing key. The decoding apparatus 22 then outputs a plurality of the obtained plaintexts.

The master key generator 23 generates a master key that is shared among a plurality of plaintexts input to the concealing apparatus 21, based on a random number or the like. The master key generator 23 stores the generated master key in the internal storage 25. The master key stored in the internal storage 25 is used in generating a concealing key.

The tag key generator 24 generates a tag key that is also shared among a plurality of plaintexts input to the concealing apparatus 21, based on a random number or the like. The tag key generator 24 stores the generated tag key in the internal storage 25. The tag key stored in the internal storage 25 is used in generating a tag.

Figure 2:
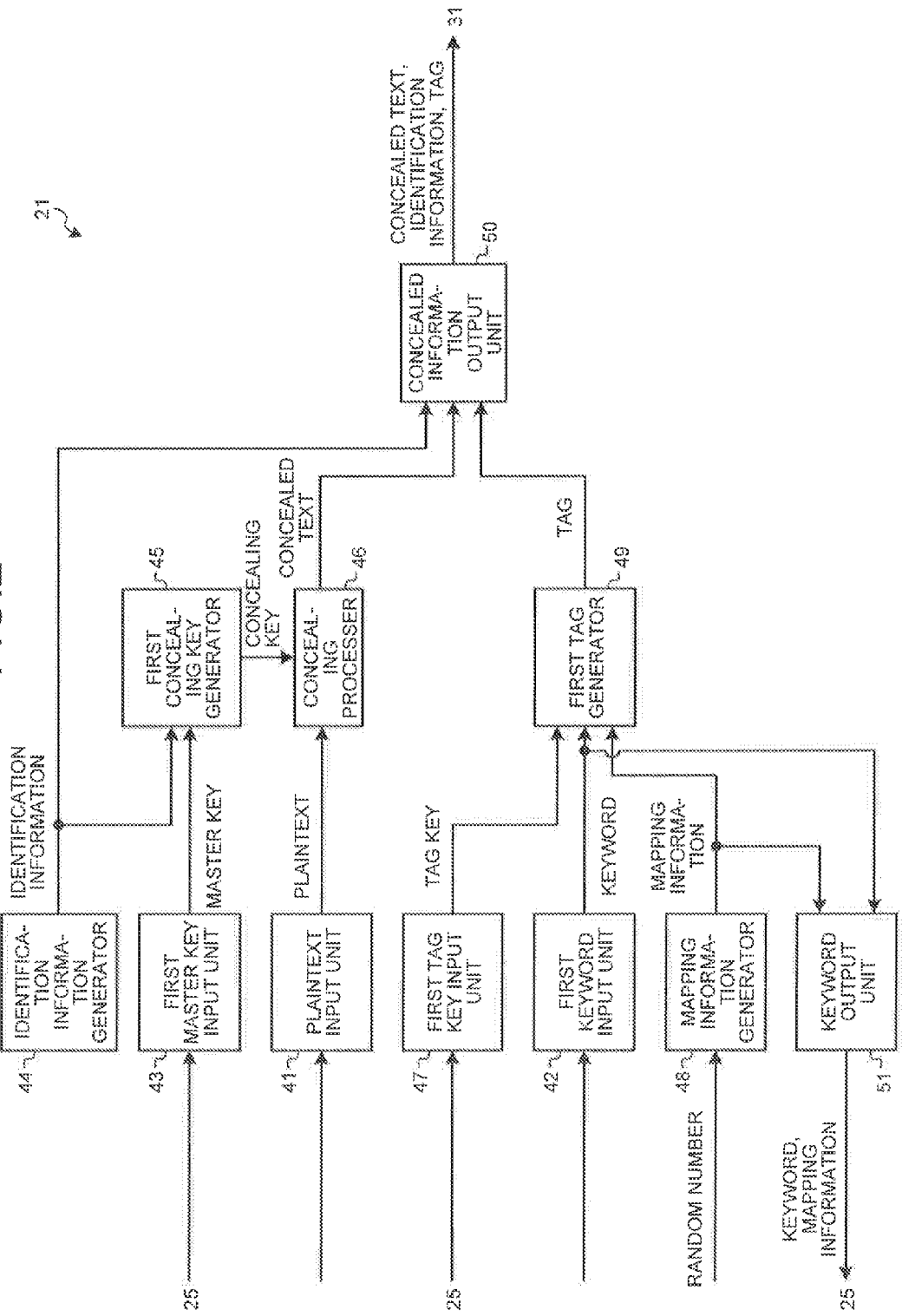
FIG. 2 is a schematic illustrating a configuration of a concealing apparatus.

FIG. 2 is a schematic illustrating a configuration of the concealing apparatus 21. The concealing apparatus 21 includes a plaintext input unit 41, a first keyword input unit 42, a first master key input unit 43, an identification information generator 44, a first concealing key generator 45, a concealing processor 46, a first tag key input unit 47, a mapping information generator 48, a first tag generator 49, a concealed information output unit 50, and a keyword output unit 51.

The plaintext input unit 41 receives an input of a plaintext to be concealed. The first keyword input unit 42 receives an input of a keyword for allowing the plaintext to be concealed to be retrieved. The first keyword input unit 42 may receive an input of a plurality of keywords.

The first master key input unit 43 receives an input of the master key stored in the internal storage 25. The identification information generator 44 generates, every time a plaintext to be concealed is received, identification information for identifying the received plaintext. The identification information is a unique value given to the plaintext.

The first concealing key generator 45 receives the master key output from the first master key input unit 43 and the identification information generated by the identification information generator 44. The first concealing key generator 45 then generates a concealing key, based on the master key and the identification information. For example, the first concealing key generator 45 generates the concealing key by populating a predetermined key generating function KeyGen( ) with the master key and the identification information, as expressed by Expression (1) below. In Expression (1), $K_s$ denotes the master key, i denotes the identification information, and $K_i$ denotes the concealing key corresponding to the identification information "i".

$$\mathrm{KeyGen}(K_s, i) \rightarrow K_i \qquad (1)$$

The concealing processor 46 receives the plaintext output from the plaintext input unit 41 and the concealing key generated by the first concealing key generator 45. The concealing processor 46 then generates a concealed text by concealing the plaintext with the concealing key. The concealing processor 46 generates the concealed text by, for example, encrypting the plaintext with the concealing key. As another example, the concealing processor 46 generates a concealed text including a plurality of shares, by secret-sharing the plaintext using the concealing key.

The first tag key input unit 47 receives an input of the tag key stored in the internal storage 25. The mapping information generator 48 generates, every time the first, keyword input unit 42 receives an input of a keyword, mapping information to be mapped to the received keyword. When the first keyword input unit 42 receives an input of a plurality of keywords, the mapping information generator 48 generates a plurality of pieces of mapping information for the respective keywords. The mapping information is a value for identifying the corresponding keyword. The same mapping information may also be mapped to a plurality of keywords.

The mapping information generator 48 generates or receives an input of a random number every time a keyword is received, and uses the generated or input random number as mapping information, as an example. The mapping information generator 48 may generate the mapping information every time a keyword is received. The mapping information generator 48 may generate different pieces of mapping information every time the same keyword is received. When the same keyword is received a plurality of number of times, the mapping information generator 48 may first generate a random number as the mapping information for the keyword received for the first time, and then generate a value incremented by a predetermined value (e.g., by one) from the random number as the mapping information for the same keyword subsequently received, as an example.

The first tag generator 49 receives the tag key output from the first tag key input unit 47, the keyword output from the first keyword input unit 42, and the mapping information generated by the mapping information generator 48. The first tag generator 49 then generates a tag based on the tag key, the keyword, and the mapping information. When a plurality of keywords are received, the first tag generator 49 generates a plurality of tags for the respective keywords, based on the tag key and the mapping information corresponding to each of the keywords.

The first tag generator 49 generates a tag by, for example, populating a predetermined tag generating function TagGen( ) with the tag key, the keyword, and the mapping information, as expressed by Expression (2) below. In Expression (2), tk denotes the tag key, $w_j$ denotes a keyword, and "r" denotes the mapping information, and $t_{j,r}$ denotes the generated tag.

$$\text{TagGen}(tk, w_j, r) \to t_{j,r} \quad (2)$$

The concealed information output unit 50 receives the concealed text generated by the concealing processor 46, the identification information generated by the identification information generator 44, and the tag generated by the first tag generator 49. The concealed information output unit 50 then outputs and stores the concealed text, the identification information, and the tag as a set, to and in the external storage 31. When a plurality of tags are received from the first tag generator 49, the concealed information output unit 50 outputs and stores the concealed text, the identification information, and the tags as a set to and in the external storage 31.

The keyword output unit 51 receives a keyword output from the first keyword input unit 42, and the mapping information generated by the mapping information generator 48. The keyword output unit 51 then outputs and stores the keyword paired with the mapping information to and in the internal storage 25. When a plurality of keywords are received from the first keyword input unit 42, the keyword output unit 51 outputs and stores the keywords and the pieces of mapping information as respective pairs in the internal storage 25.

When the concealing processor 46 secret-shares to generate a concealed text including a plurality of shares (for example, "q" shares), the storage 30 is provided with a plurality of different external storages 31 (e.g., different external storages). The external storages 31 are, for example, different servers on the network. The share concealed information output unit 50 distributes and stores the "q" shares to and in the "q" external storages 31, respectively, in a manner paired, with the corresponding tag and identification information.

Figure 3:
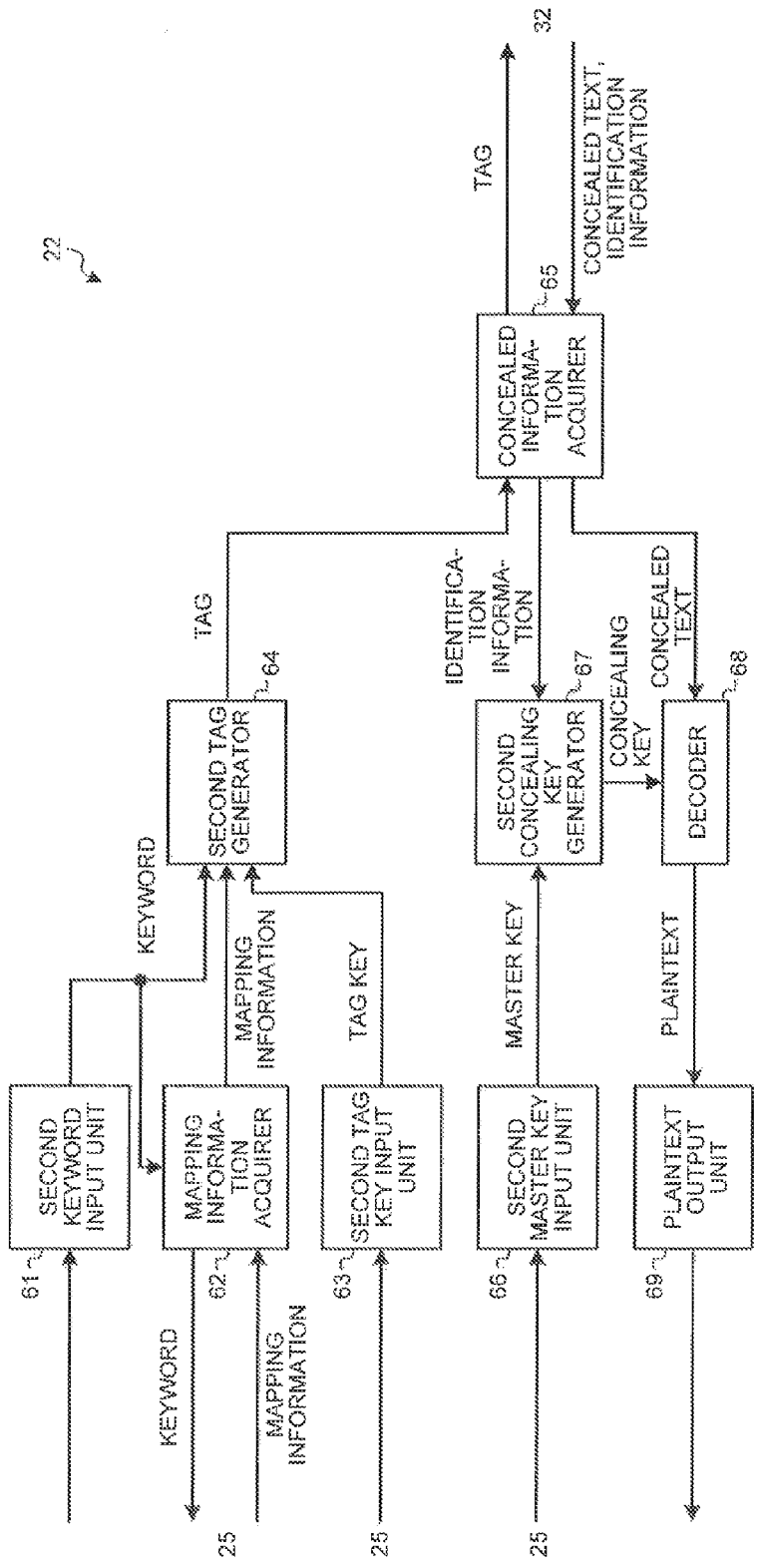
FIG. 3 is a schematic illustrating a configuration of a decoding apparatus.

FIG. 3 is a schematic illustrating a configuration of the decoding apparatus 22. The decoding apparatus 22 includes a second keyword input unit 61, a mapping information acquirer 62, a second tag key input unit 63, a second tag generator 64, a concealed information acquirer 65, a second master key input unit 66, a second concealing key generator 67, a decoder 68, and a plaintext output unit 69.

The second keyword input unit 61 receives an input of a keyword for retrieving for a plaintext. The mapping information acquirer 62 receives the keyword output from the second keyword input unit 61, and acquires the mapping information corresponding to the received keyword from the internal storage 25.

The internal storage 25 may store therein a plurality of pieces of mapping information for one keyword. In such a case, the mapping information acquirer 62 acquires a plurality of pieces of mapping information corresponding to the received one keyword. If no mapping information corresponding to the received, keyword is stored the internal storage 25, the mapping information acquirer 62 outputs a notification indicating no keyword is found to the external.

The second tag key input unit 63 receives an input of the tag key stored in the internal storage 25. The second tag generator 64 receives the tag key output from the second tag key input unit 63, the keyword output from the second keyword input unit 61, and the mapping information acquired by the mapping information acquirer 62. The second tag generator 64 then generates a tag based on the tag key, the keyword, and the mapping information. When a plurality of pieces of mapping information are acquired by the mapping information acquirer 62, the second tag generator 64 generates a plurality tags for the respective pieces of mapping information.

The second tag generator 64 generates a tag using the same scheme as that used by the first tag generator 49. For example, the second tag generator 64 generates a tag by populating the same tag generating function TagGen( ) mentioned above in Expression (2) with the tag key, the keyword, and the mapping information. In this manner, given the same keyword and the same mapping information, the second tag generator 64 can produce the same tag as that produced at the time of concealment.

The concealed information acquirer 65 outputs the tag generated by the second tag generator 64 to the retriever 32. When a plurality of tags are generated by the second tag generator 64, the concealed information acquirer 65 outputs the tags to the retriever 32. Upon receiving the tags from the concealed information acquirer 65, the retriever 32 retrieves a concealed text and identification information included in the same set as each of the received tags, from a plurality of sets of a concealed text, identification information, and a tag stored in the external storage 31. When a plurality of concealed texts and a plurality of pieces of identification information are extracted as being included in the same sets as any one of the received tags, the retriever 32 outputs the extracted concealed texts paired with the respective pieces of identification information to the concealed information acquirer 65. The concealed information acquirer 65 then receives an input of the concealed texts that are paired with the respective pieces of identification information from the retriever 32.

The second master key input unit 66 receives an input of the master key stored in the internal storage 25. The second concealing key generator 67 receives the master key output from the second master key input unit 66, and the identification information acquired, by the concealed information acquirer 65. The second concealing key generator 67 then generates a concealing key based on the master key and the identification information. When a plurality of pieces of identification information are acquired by the concealed information acquirer 65, the second concealing key generator 67 generates a plurality of concealing keys for the respective pieces of identification information.

The second concealing key generator 67 generates a concealing key using the same scheme as that used by the first concealing key generator 45. For example, the second concealing key generator 67 generates a concealing key by populating the same key generating function keyGen( ) mentioned above in Expression (1) with the master key and the identification information. In this manner, given the same identification information, the second concealing key generator 67 can generate the same concealing key as that generated at the time of concealment.

The decoder 68 receives the concealed text acquired by the concealed information acquirer 65, and the concealing key generated by the second concealing key generator 67. The decoder 68 then decodes the concealed text into a plaintext using the concealing key. When a plurality of concealed texts are acquired by the concealed information acquirer 65, the decoder 68 decodes the concealed texts into a plurality of respective plaintexts using the respective concealing keys.

The decoder 68 decodes a concealed text resulting from the encrypting of a plaintext using the concealing key into the plaintext, as an example. As another example, the decoder 68 decrypts the concealed text into a plaintext including a plurality of shares generated by secret-sharing the plaintext with the concealing key. In such a case, the decoder 63 recovers the concealed text into the plaintext using a scheme corresponding to the scheme used in concealing the plaintext by the concealing processor 46. In this manner, the decoder 68 can recover the concealed text generated by the concealing processor 46 into the corresponding plaintext.

The plaintext output unit 69 outputs the plaintext obtained by the decoder 68. When a plurality of concealed texts are acquired by the concealed information acquirer 65, the plaintext output unit 69 outputs a plurality of respective plaintexts.

When the concealing apparatus 21 generates a concealed text including a plurality of shares (e.g., "q" shares) by secret-sharing, the retriever 32 accesses the "q" different external storages 31, retrieves the shares corresponding to the received tag and identification information paired with the respective shares, and acquires a specified number of the shares and the pieces of identification information paired with the respective shares, the specified number being the number from which the plaintext can be recovered. When used is the threshold secret snaring, for example, the retriever 32 can acquire pairs of the share and the identification information in a number less than "q". In other words, the retriever 32 does not need to access all of the "q" external storages 31, as long as the retriever 32 can access the specified number of the external storages 31. The retriever 32 then outputs the concealed text including the specified number of shares, the identification information, and the tag as a set, to the concealed information acquirer 65.

When the concealing apparatus 21 generates the concealed text including a plurality of shares by secret-sharing, the decoder 68 recovers the plaintext from, the specified number of shares, without using the concealing key. In such a case, the decoding apparatus 22 does not include the second master key input unit 66 and the second concealing key generator 67.

Figure 4:
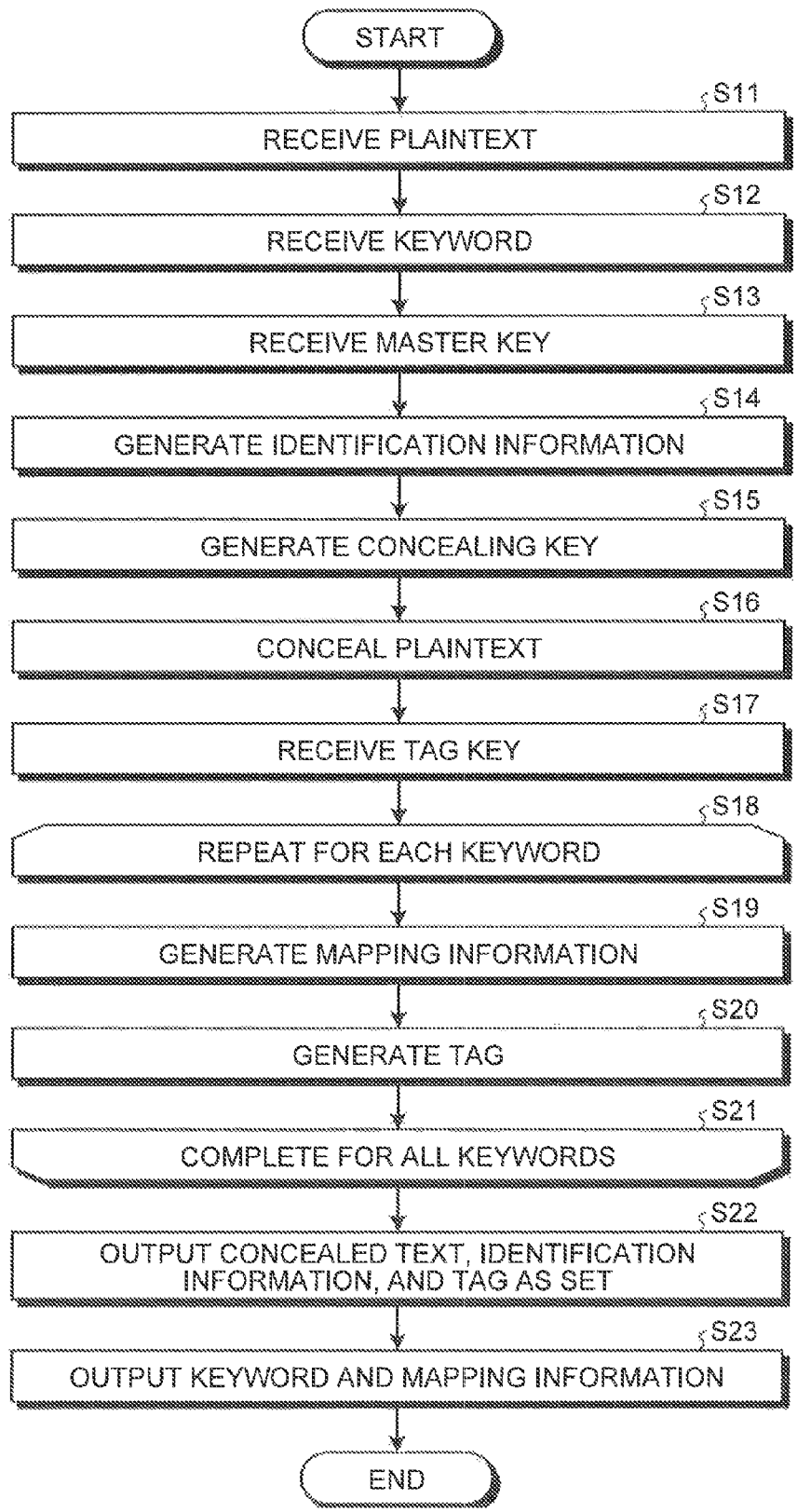
FIG. 4 is a flowchart illustrating a concealing process.

FIG. 4 is a flowchart illustrating a concealing process. To conceal a plaintext, the concealing apparatus 21 executes the process of the flowchart illustrated in FIG. 4.

To begin with, the plaintext input unit 41 receives an input of a plaintext to be concealed (S11). The first keyword input unit 42 then receives an input of a keyword (S12). The first keyword input unit 42 may receive an input of a plurality of keywords. The first master key input unit 43 then receives an input of the master key stored in the internal storage 25 (S13). The identification information generator 44 then generates the identification information (S14).

The first concealing key generator 45 then, generates a concealing key, based on the master key and the identification information (S15). The concealing processor 46 generates a concealed text by concealing the received plaintext with the concealing key (S16). The first tag key input unit 47 receives an input of the tag key stored in the internal storage 25 (S17).

The mapping information generator 48 and the first tag generator 49 repeat the process at Step S19 and Step S20, for each of the keywords (loop processing between S18 and S21). In this loop, the mapping information generator 48 generates a piece of mapping information that is to be mapped to the keyword being processed (S19). The mapping information generator 48 generates or receives a new random number, and uses the random number as the mapping information, as an example. The first tag generator 49 then generates a tag based on the tag key, the keyword, and the generated mapping information (S20). Once this process is completed for all of the keywords, the first tag generator 49 exits the loop, and the process is shifted to Step S22 (S21).

The concealed information output unit 50 then outputs and stores the generated concealed text, the generated identification information, and the generated tag as a set, to and in the external storage 31 (S22). When a plurality of keywords are received, the concealed information output unit 50 outputs and stores the concealed, text, the identification information, and the tags as a set to and in the external storage 31.

The keyword output unit 51 then outputs and stores the keyword and the mapping information as a pair in the internal storage 25 (S23). When a plurality of keywords are received, the keyword output unit 51 outputs and stores the keywords and the respective pieces of mapping information as a plurality of pairs in the internal storage 25. The concealing apparatus 21 may execute the process of Step S17 to Step S21 before the process of Step S13 to Step S16. Alternatively, the concealing apparatus 21 may execute the process of Steps S13 to S16 and the process of Steps S17 to S21 in parallel.

FIG. 5 is a schematic illustrating a first example of a mapping relation between a keyword and mapping information stored in the internal storage 25. FIG. 6 is a schematic illustrating a second example of the mapping relation between a keyword and mapping information stored in the internal storage 25.

The internal storage 25 stores therein a keyword and mapping information as a pair, for each of a plurality of keywords. In the internal storage 25, one keyword may be mapped to a plurality of pieces of mapping information, as a result of concealing a plurality of plaintexts. In such a case, the internal storage 25 may store an additional pair of the same keyword and another piece of corresponding mapping information, as illustrated in FIG. 5.

The internal storage 25 may also store therein one keyword paired with a plurality of pieces of mapping information, as illustrated in FIG. 6. In such a configuration, when the keyword paired with a piece of mapping information is received from the concealing apparatus 21, the internal storage 25 retrieves the same keyword already stored. If the internal storage 25 detects the same keyword, the internal storage 25 stores the received, mapping information in a manner mapped to the keyword. If the internal storage 25 does not detect the same keyword, the internal storage 25 adds and stores the received pair of the keyword and the mapping information.

When the same keyword is received a plurality of number of times, the mapping information generator 48 may generate a random number as the mapping information for the keyword received for the first time, and generate a value incremented by a predetermined increment (e.g., by one) from the random number as the mapping information for the same keyword subsequently received, as an example. In such a case, the internal storage 25 may store therein, the value of the random number generated for the keyword received for the first time, and the number of times the mapping information is generated, for the same keyword. When a plaintext is then retrieved using the same keyword, the internal storage 25 outputs the random number originally generated and the numbers that are incremented at the predetermined increment, by the number of times the mapping information is generated, as the mapping information.

Figure 7:
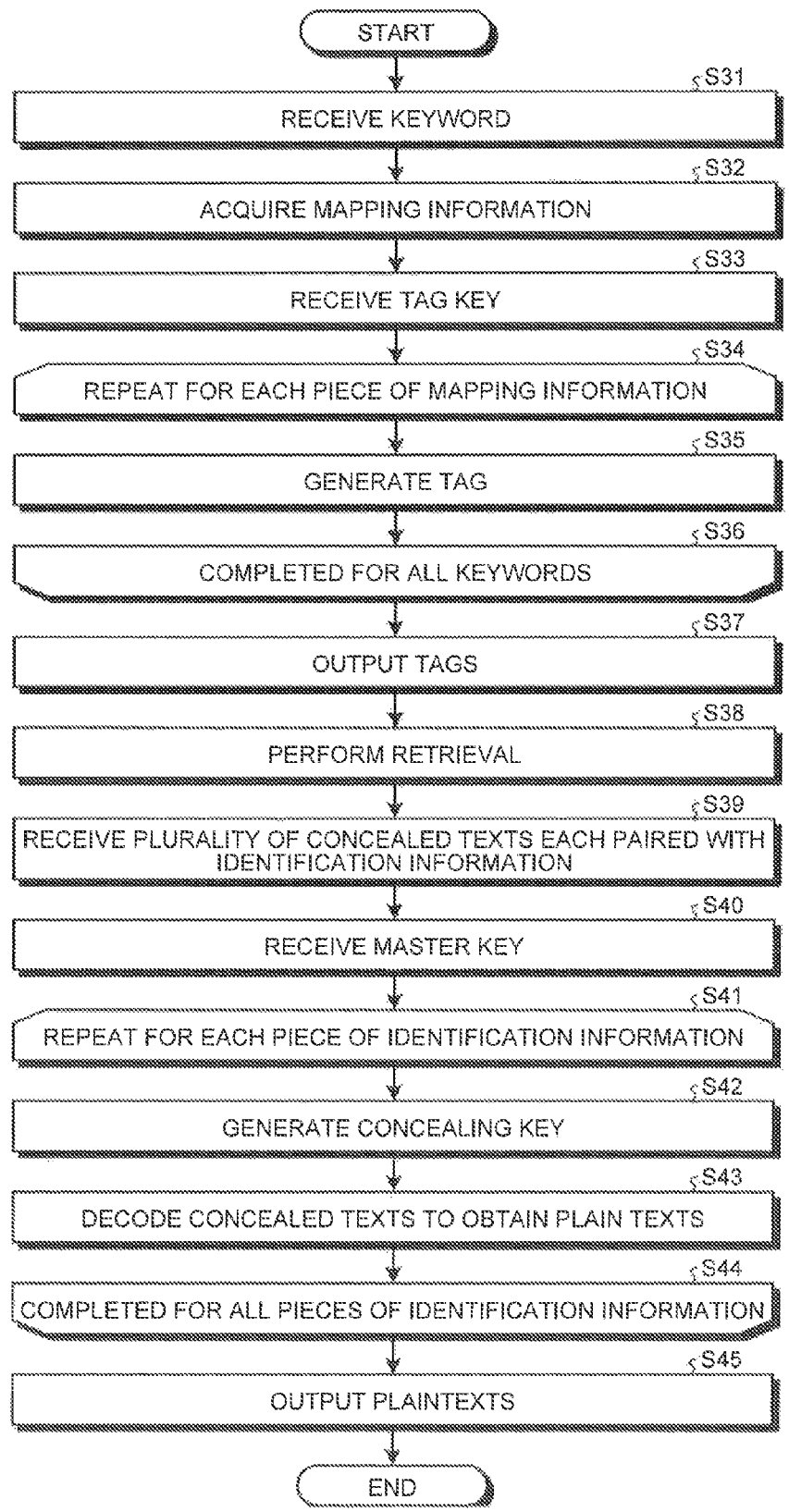
FIG. 7 is a flowchart illustrating a decoding process.

FIG. 7 is a flowchart illustrating a decoding process. The decoding apparatus 22 executes the process of the flowchart illustrated in FIG. 7.

To begin with, the second keyword input unit 61 receives an input of a keyword with which a plaintext is retrieved (S31). The mapping information acquirer 62 then acquires mapping information corresponding to the received keyword from the internal storage 25 (S32). If a plurality of pieces of mapping information are stored for the received keyword, the mapping information acquirer 62 acquires the pieces of mapping information. The second tag key input unit 63 then receives an input of the tag key stored in the internal storage 25 (S33).

The second tag generator 64 then performs the process at Step S35, for each of the acquired pieces of mapping information (loop processing between S34 to S36). In this loop, the second tag generator 64 generates a tag based on the tag key, the keyword, and the corresponding piece of mapping information. Once the second tag generator 64 generates tags for all of the pieces of mapping information, the process is shifted to Step S37.

The concealed information acquirer 65 then outputs all of the generated tags to the retriever 32 (S37). The retriever 32 then retrieves the concealed text, the identification information, and the tags included in the same set as each of the received tags from a plurality of sets of the concealed texts, the identification information, and the tags stored in the external storage 31 (S38). When a plurality of concealed texts and the identification information are extracted as being included in the same set as each of the received tags, the retriever 32 outputs the extracted concealed texts and the identification information as a plurality of pairs to the concealed information acquirer 65.

The concealed information acquirer 65 then receives an input of the pair of the concealed text and the identification information output from the retriever 32 (S39). The second master key input unit 66 then receives an input of the master key stored in the internal storage 25 (S40).

The second concealing key generator 67 and the decoder 68 then repeat the process at Step S42 and Step S43 for each of the pieces of identification information acquired by the concealed information acquirer 65 (loop processing between S41 and S44). In this loop, the second concealing key generator 67 generates a concealing key corresponding to the identification information being processed, based on the master key, and the identification information acquired by the concealed information acquirer 65 (S42). In this loop, the decoder 68 then decodes the concealed text that is paired with the identification information being processed to obtain a plaintext, using the generated concealing key (S43). Once the second concealing key generator 67 and the decoder 68 decode the plaintexts for all of the pieces of identification information, the process is shifted to Step S45.

The plaintext output unit 69 then outputs the entire plaintexts obtained (S45).

Figure 8:
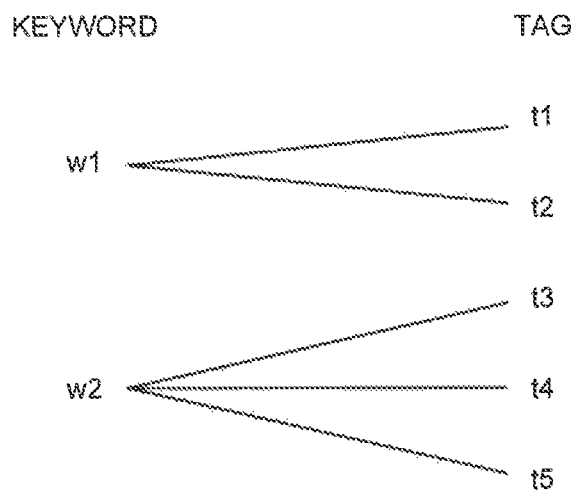
FIG. 8 is a schematic illustrating a first example of a mapping relation between a keyword and a tag.

FIG. 8 is a schematic illustrating a first example of a mapping relation between a keyword and a tag. Even when the same keyword is received, the mapping information generator 48 generates a different piece of mapping information every time the keyword is received. Therefore, even when the same keyword is input to the first tag generator 49, the first tag generator 49 generates a different tag every time the keyword is received. The first tag generator 49, however, does not always need to generate a different tag for the same keyword, and may generate the same tag for the same keyword redundantly.

The first tag generator 49 generates a tag that is mapped to one keyword but not to the other keywords, as an example. For example, the first tag generator 49 generates a tag as illustrated in FIG. 8. In FIG. 8, a tag t1 and a tag t2 are mapped to a keyword w1, but not to the other keyword. A tag t3, a tag t4, and a tag t5 are mapped to a keyword w2, but not to the other keyword.

The first tag generator 49 generates such a tag using a tag generating function indicated by following Equation (3-1), Equation (3-2), or Equation (3-3), as an example.

$$t=F(w//r) \qquad (3\text{-}1)$$

$$t=F(G(w//r)) \qquad (3\text{-}2)$$

$$t=F(G(r//w)) \qquad (3\text{-}3)$$

where // is a function for concatenating the data strings on both sides of this symbol, G( ) is a function that replaces the bit arrangement of the input data based on a predetermined rule. F( ) is a function that maps the input data and the output data in a one-to-one relation. In Equation (3-1), Equation (3-2), and Equation (3-3), the function G( ) and function F( ) correspond to a tag key "tk".

By using these functions, the first tag generator 49 can generate a plurality of tags each, of which is mapped, to one keyword. With such tags, the retrieval system 10 does not extract any concealed texts not mapped with the entered keyword. Therefore, the retrieval system 10 can retrieve and decode concealed texts efficiently.

Figure 9:
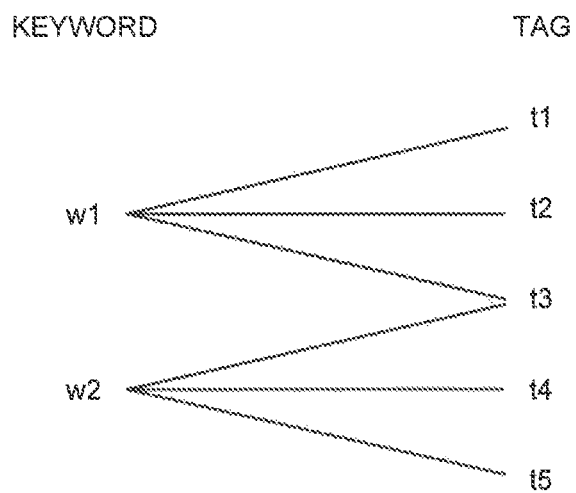
FIG. 9 is a schematic illustrating a second example of the mapping relation between a keyword and a tag.

FIG. 9 is a schematic illustrating a second example of a mapping relation between a keyword and a tag. The first tag generator 49 may generate a tag that can be mapped to a plurality of keywords.

As another example, the first tag generator 49 may generate a tag as illustrated in FIG. 9. In other words, in FIG. 9, the tag t1 and the tag t2 are mapped to the keyword w1, but are not mapped to the other keyword. The tag t4 and the tag t5 are mapped to the keyword w2, but are not mapped to the other keyword. The tag t3, however, is mapped to both of the keyword w1 and the keyword w2.

The first tag generator 49 generates a tag using a tag generating function, indicated by following Equation (4) or Equation (5), for example.

$$t=\text{Hash}(tk//w//r) \qquad (4)$$

$$t=\text{Hash}(tk \times w \times r) \qquad (5)$$

Hash( ) is a hash function for calculating a hash from the input data, and × is a function for multiplying the values on both sides of this symbol. To generate a tag, the first tag generator 49 may use a hash function including values that are based on tk, w, and k as its arguments in addition to Equation (4) and Equation (5).

As another example, the first tag generator 49 may generate a tag using a tag generating function expressed by following Equation (6-1) or Equation (6-2).

$$t=F(G(w \times r)) \tag{6-1}$$

$$t=F(G(r \times w)) \tag{6-2}$$

In Equation (6-1) and Equation (6-2), the function G( ) and the function F( ) corresponding to the tag key "tk".

The first tag generator 49 may also generate a tag with a randomizing function having values that are based on "tk", "w", and "r" above as arguments, as well as with Equations mentioned above.

By using such functions, the first tag generator 49 can generate a plurality of tags each of which is enabled to be mapped to a plurality of keywords. By permitting the retrieval system 10 to make retrieval using such a tag, even it an eavesdropper or the like detects concealed texts corresponding to the same keyword, the retrieval system 10 will extract the concealed texts containing some error, so that higher security can be achieved.

Figure 10:
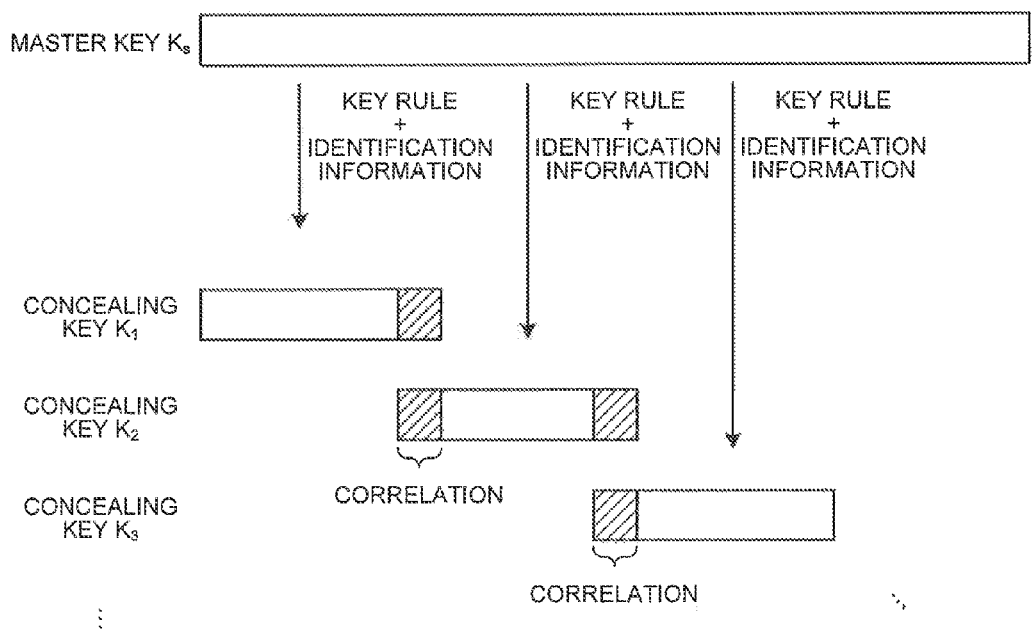
FIG. 10 is a schematic illustrating a relation between a master key and a concealing key.

FIG. 10 is a schematic illustrating a relation between a master key and a concealing key. The first concealing key generator 45 generates a concealing key corresponding to a piece of identification information based on the master key and the identification information.

The first concealing key generator 45 generates a concealing key from the master key using the method of generating a client key from a server key disclosed in Japanese Patent Application Laid-open No. 2014-192612, for example. In other words, the first concealing key generator 45 generates a different concealing key for each piece of identification information (for each plaintext) based on a predetermined key rule and the identification information.

In such a case, the first concealing key generator 45 generates a plurality of concealing keys that are different among a plurality of respective pieces of identification information, and each, of which, is partially correlated, with one of the other concealing key. In other words, each of the concealing keys partly contains a bit sequence having a correlation with the other concealing key. By using such concealing keys, the retrieval system 10 can reduce the amount of concealed information to be retained, compared with that required when all of the concealing keys are retained.

The key rule is a rule for generating a concealing key $K_i$ by extracting one or more partial sequences from the master key $K_s$. In other words, a key rule is a rule for defining the concealing key $K_i$. The concealing key $K_i$ is defined by a set of partial sequences including the one or more partial sequences as its elements. Any two of a plurality of concealing keys $K_i$ have at least one partial sequence common among those in the respective first sets of partial sequences included in the respective two concealing keys $K_i$. A partial sequence is information making up a part of the master key $K_s$. The key rule may be public information (in other words, not concealed information), or secret information that is concealed and kept under control.

Figure 11:
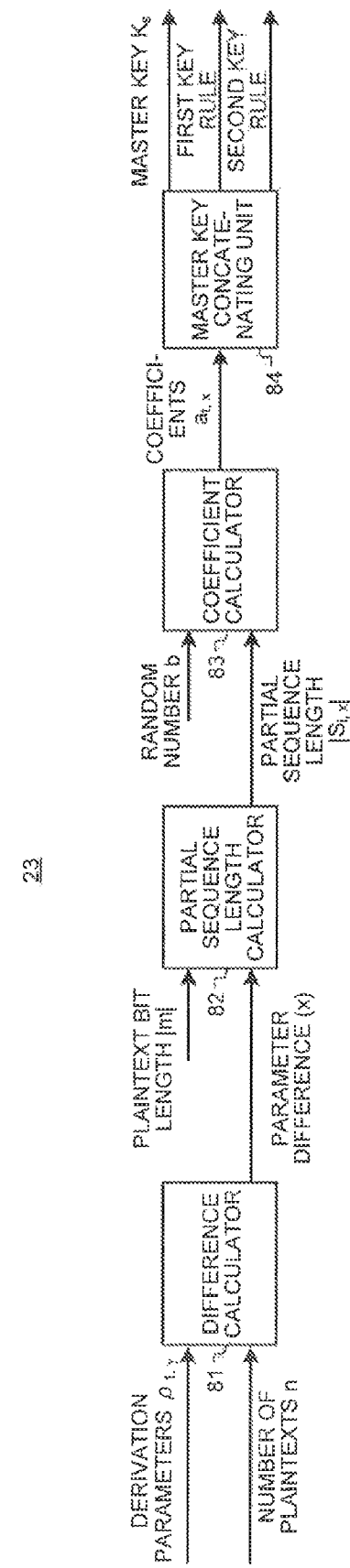
FIG. 11 is a schematic illustrating an exemplary configuration of a master key generator.
Figure 12:
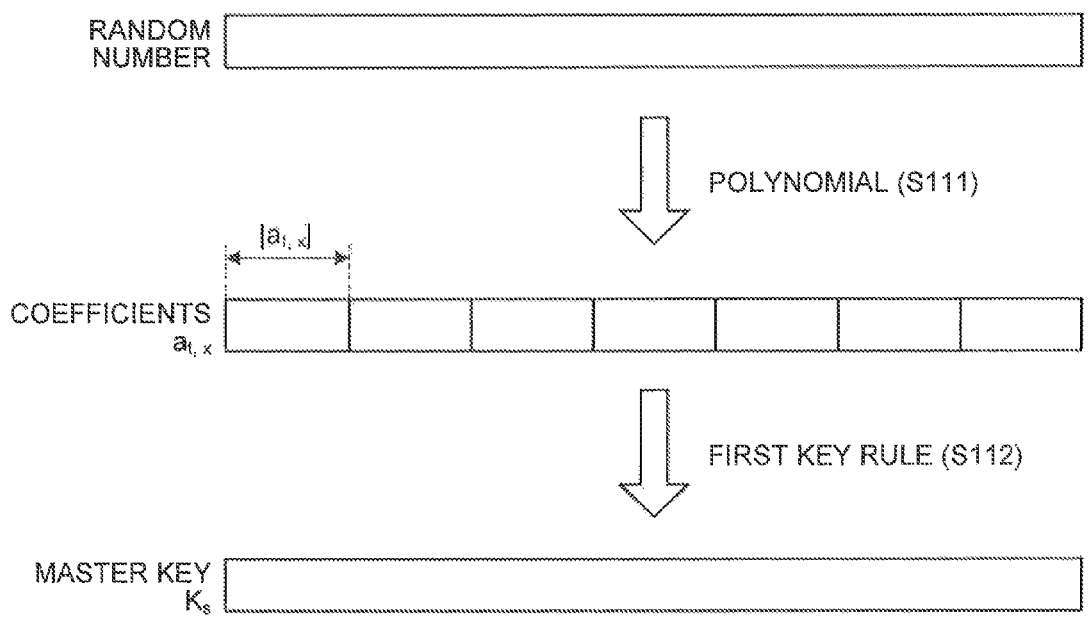
FIG. 12 is a schematic illustrating a process of generating a master key from a random number.

FIG. 11 is a schematic illustrating an exemplary configuration of the master key generator 23. FIG. 12 is a schematic illustrating a process of generating a master key from a random number.

As an example, the concealing processor 46 generates "n" concealed texts $C_i$ (=$C_1, C_2, \ldots, C_n$) (where "n" is an integer equal to or more than two) by encrypting "n" plaintexts $M_i$ (=$M_1, M_2, \ldots, M_n$) using "n" concealing key $K_i$ (=$K_1, K_2, \ldots, K_n$), respectively. The "n" concealing keys all have the same bit length. Each plaintext and the concealing key both have the same bit length of |m|. The concealing processor 46 then generates the concealed text $C_i$ by calculating an exclusive disjunction of the plaintext $M_i$ and the concealing key $K_i$. The concealing processor 46 can use this same technique to conceal the plaintexts having different lengths, by making the lengths equal by dividing the plaintexts into a fixed length, or applying some process such as padding to the plaintexts. In this example, the concealing processor 46 generates a concealed text $C_i$ using a one-time pad, but may generate the concealed text $C_i$ using another encryption technique.

When the concealing processor 46 performs such encryption, and the master key generator 23 generates a master key $K_s$ for generating a plurality of concealing keys each partially correlated with one of the other concealing key, the master key generator 23 has a configuration illustrated in FIG. 11, as an example. In other words, the master key generator 23 includes a difference calculator 81, a partial sequence length calculator 82, a coefficient calculator 83, and a master key concatenator 84.

The difference calculator 81 receives an input of that is the number of plaintexts, and "n" derivation parameters $\rho_{1,y}$. The number of plaintexts "n" represents the maximum number of plaintexts that can be encrypted, that is, the number of concealing keys to be generated. The "n" derivation parameters $\rho_{1,y}$ are values specified by a user, and take values within a range equal to or more than zero and equal to or less than one. The "n" derivation parameters $\rho_{1,y}$ represent the security of any one of the plaintexts assuming that an attacker comes to know the "n" concealed texts and "y" concealing keys (where "y" is an integer equal to or more than zero and equal to or less than n−1). The "n" derivation parameters $\rho_{1,y}$ are denoted by $\rho_{1,0}$, $\rho_{1,1}$, $\rho_{1,2}, \ldots, \rho_{1,n-1}$, respectively. A greater derivation parameter $\rho_{1,y}$ (nearer one) means a higher level of security.

The difference calculator 81 calculates a difference $d(x)=(\rho_{1,x-1}-\rho_{1,x})$ for each value of x (where "x" is an integer equal to or more than zero and equal to or less than n). In other words, the difference calculator 81 calculates $d(0)=(\rho_{1,-1}-\rho_{1,0})$, $d(1)=(\rho_{1,0}-\rho_{1,1})$, $d(2)=(\rho_{1,1}-\rho_{1,2}), \ldots$, and $d(n)=(\rho_{1,n-1}-\rho_{1,n})$.

$\rho_{1,-1}$ and $\rho_{1,n}$ are predefined as dummy derivation parameters. In this example, these dummy derivation parameters are specified as $\rho_{1,-1}=1$, and $\rho_{1,n}=0$.

The partial sequence length calculator 82 receives an input of the bit length |m| of the plaintexts, and the differences $d(x)$ calculated by the difference calculator 81. The partial sequence length calculator 82 calculates the partial sequence length $|S_{i,x}|$ for each value of x, by performing the operation of Equation (7) below. If the partial sequence length $|S_{i,x}|$ is not an integer, the partial sequence length calculator 82 performs a process such as rounding down to the nearest decimal point, rounding up to the nearest decimal point, or rounding off to the nearest integer so as to make "x" an integer.

$$|S_{i,x}|=d(x) \times |m| \tag{7}$$

The coefficient calculator 83 receives an input of the partial sequence length $|S_{i,x}|$ and a random number "b". The coefficient calculator 83 then acquires the coefficients $a_{t,x}$ in the polynomial expressed as Expression (8) below, for each x.

$$\sum_{t=0}^{x-1} a_{t,x} t^t \bmod 2^{|S_{i,x}|} \tag{8}$$

The coefficients $a_{t,x}$ are random numbers that are different from one another, and the bit length of each of these coefficients $a_{t,x}$ serves as the length of the corresponding partial sequence $|S_{i,x}|$. For example, the coefficient calculator 83 extracts bit strings with the partial sequence length $|S_{i,x}|$ from the received random number "b", as illustrated at S111 in FIG. 12, and generates the coefficient $a_{t,x}$ for each. The coefficient calculator 83 then outputs the acquired coefficients.

The master key concatenator 84 receives an input of the coefficients $a_{t,x}$ output from the coefficient calculator 83. The master key concatenator 84 generates a master key $K_s$ by arranging the acquired coefficients $a_{t,x}$, e.g., by concatenating or replacing the coefficients based on the first key rule, as indicated at S112 in FIG. 12.

The master key concatenator 84 then outputs the first key rule, a second key rule, and the master key $K_s$. The first key rule is a rule for generating a master key $K_s$ from the coefficients $a_{t,x}$. The second key rule is a rule for generating a concealing key $K_i$ from the coefficient $a_{t,x}$ corresponding to identification information "i", the coefficient $a_{t,x}$ being a coefficient selected from the coefficients $a_{t,x}$.

Figure 13:
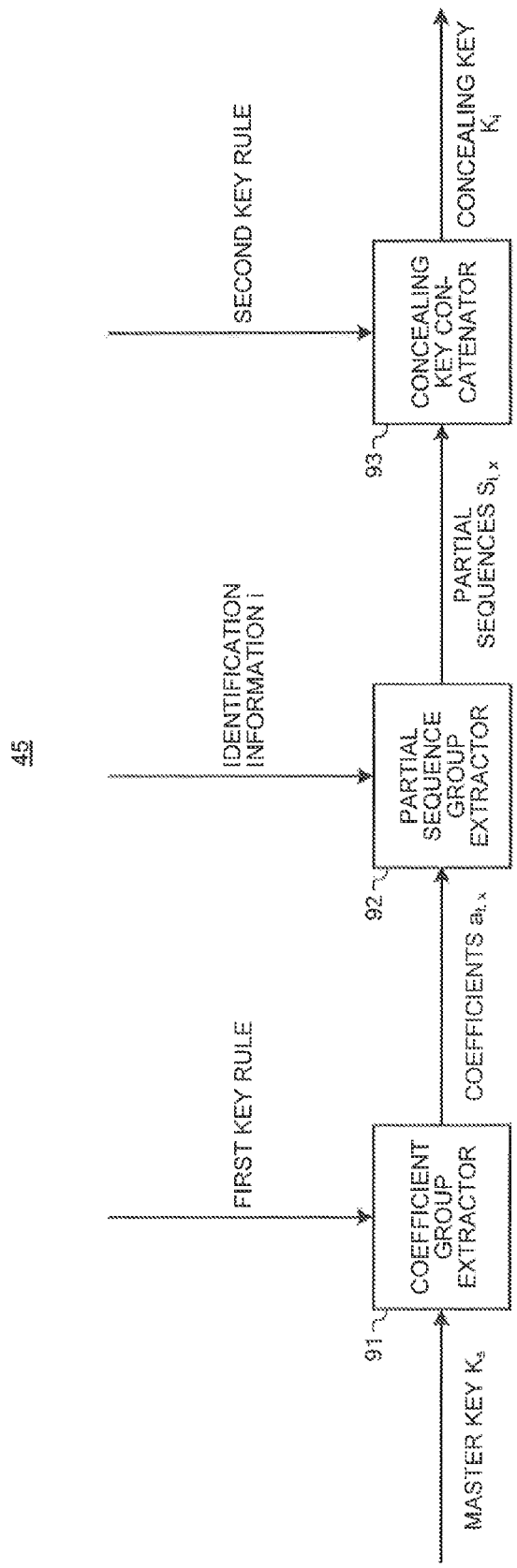
FIG. 13 is a schematic illustrating an exemplary configuration of a first concealing key generator.
Figure 14:
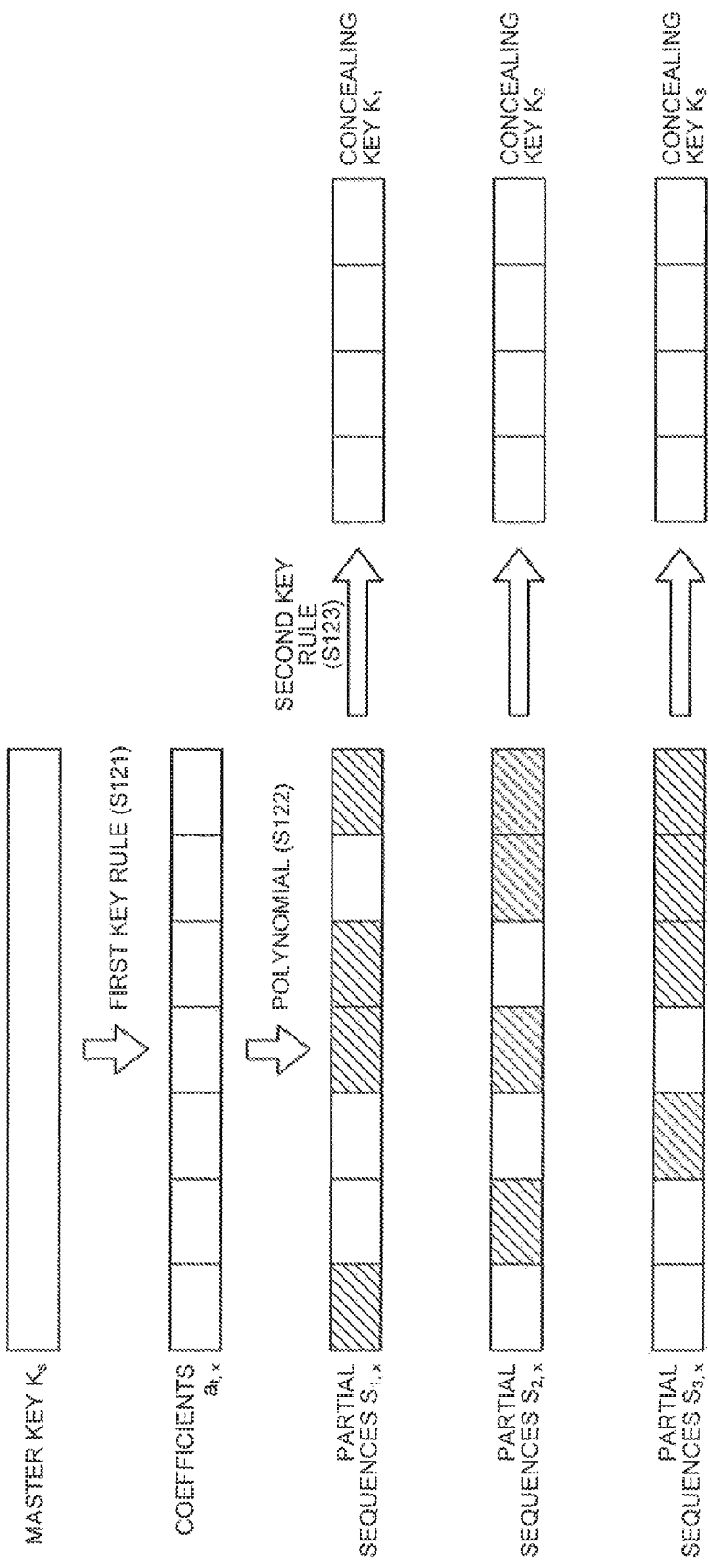
FIG. 14 is a schematic illustrating a process of generating a concealing key from a master key.

FIG. 13 is a schematic illustrating an exemplary configuration of the first concealing key generator 45. FIG. 14 is a schematic illustrating a process of generating a concealing key from a master key.

To generate a concealing key from the master key generated by the master key generator 23 illustrated in FIG. 11, the first concealing key generator 45 has a configuration illustrated in FIG. 13, as an example. In other words, the first concealing key generator 45 includes a coefficient group extractor 91, a partial sequence group extractor 92, and a concealing key concatenator 93.

The coefficient group extractor 91 receives an input of the master key $K_s$ and the first key rule. The coefficient group extractor 91 extracts a plurality of coefficients $a_{t,x}$ from the master key $K_s$, following the first key rule, as indicated at S121 in FIG. 14.

The partial sequence group extractor 92 receives an input of the coefficients $a_{t,x}$ extracted by the coefficient group extractor 91, and the identification information "i". The partial sequence group extractor 92 then selects the coefficients x of which, matches x in $s_{i,x}$ from the group of coefficients $a_{t,x}$, and generates a polynomial $f_x(i)$, to generate a partial sequence $s_{i,x}$ as indicated at S122 in FIG. 14. The partial sequence $s_{i,x}$ are output from the polynomial $f_x(i)$. The polynomial $f_x(i)$ is a polynomial representing Expression (8), as expressed by Equation (9) below.

$$S_{i,x} = f_x(i) = \sum_{t=0}^{x-1} a_{t,x} i^t \bmod 2^{|S_{i,x}|} \tag{9}$$

The concealing key concatenator 93 receives an input of the partial sequences $S_{i,x}$ corresponding to the identification information "i", and the second key rule. The concealing key concatenator 93 generates a concealing key $K_i$ corresponding to the identification information "i" by arranging the acquired partial sequences $S_{i,x}$, e.g., by concatenating or replacing the coefficients based on the second key rule, as indicated at S123 in FIG. 14.

A specific example of how the concealing key $K_i$ is generated will now be explained, assuming that the number of plaintexts "n" (the number of concealing keys "n") is four.

Let us assume herein that, for example, the following four derivation parameters $\rho_{1,y}$ are received.

$\rho_{1,0}=1$ $\rho_{1,1}=1$ $\rho_{1,2}=0.8$ $\rho_{1,3}=0$

With such parameters, the differences $d(x)$ will be calculated as follows.

$d(0)=(\rho_{1,-1}-\rho_{1,0})=(1-1)=0$ $d(1)=(\rho_{1,0}-\rho_{1,1})=(1-1)=0$ $d(2)=(\rho_{1,1}-\rho_{1,2})=(1-0.8)=0.2$ $d(3)=(\rho_{1,2}-\rho_{1,3})=(0.8-0)=0.8$ $d(4)=(\rho_{1,3}-\rho_{1,4})=(0-0)=0$ The polynomial corresponding to each value of x will be as expressed by following Equation (10) and Equation (11). $S_{i,0}$, $S_{i,1}$, $S_{i,4}$ do not need to be generated because $d(x) \times |m|=0$.

$$S_{i,2} = \sum_{t=0}^{1} a_{t,2} i^t = a_{0,2} + a_{1,2} i \tag{10}$$

$$S_{i,3} = \sum_{t=0}^{2} a_{t,3} i^t = a_{0,3} + a_{1,3} i + a_{2,3} i^2 \tag{11}$$

The master key $K_s$ is a combination of the coefficients $a_{t,x}$ included in the polynomials $f_2(i)$ and $f_3(i)$. The elements of the master key $K_s$ will therefore be as expressed by Equation (12) below.

$$K_s=\{a_{t,x}|x=1,\ldots,n,t=0,\ldots,x-1\}=\{a_{0,2},a_{1,2},a_{0,3},a_{1,3},a_{2,3}\} \tag{12}$$

If the first key rule specifies concatenation of the elements, for example, the master key $K_s$ will be as follows.

$K_s=a_{0,2}//a_{1,2}//a_{0,3}//a_{1,3}//a_{2,3}$

The concealing key $K_i$ corresponding to the identification information "i" is made up from a group of outputs $S_{i,x}$ from the polynomials $f_x(i)$ generated from the coefficients $a_{t,x}$ selected from the master key (in other words, the coefficients $a_{t,x}$ included in the polynomials corresponding to $S_{i,2}$ and $S_{i,3}$). Therefore, the elements of the concealing key $K_i$ will be as expressed by following Equation (13).

$$K_i=\{S_{i,x}|x=1,\ldots,4\} \tag{13}$$

When the second key rule specifies concatenation of the elements, for example, the concealing key $K_i$ will be as follows.

$K_1=S_{1,1}//S_{1,2}//S_{1,3}//S_{1,4}$ $K_2=S_{2,1}//S_{2,2}//S_{2,3}//S_{2,4}$ $K_3=S_{3,1}//S_{3,2}//S_{3,3}//S_{3,4}$ $K_4=S_{4,1}//S_{4,2}//S_{4,3}//S_{4,4}$

Because the retrieval system 10 according to the embodiment generates a tag based on a keyword and mapping information as described above, different tags are generated for the same keyword. In this manner, the retrieval system 10 makes estimations of the content of or the statistical information of the concealed text difficult. The security is therefore improved. Furthermore, because the retrieval system 10 merely needs to store therein concealed keywords and concealed mapping information, the amount of information needed to be retained to make retrieval possible can be reduced. With the retrieval system 10 according to the embodiment, therefore, the amount of information required to be retained for retrieval can be reduced, and the security of concealed texts and tags can be improved.

The embodiment described above can be used in a system that collects a large amount of private information, and manages the collected information in a concealed manner, for example. The embodiment may be used in, for example, a medical system that collects detection data from sensors detecting conditions of patients (such as thermometers, sphygmomanometers, and pulse monitors), encrypts each piece of the collected detection data, and manages the encrypted data, for example.

Second Embodiment

Figure 15:
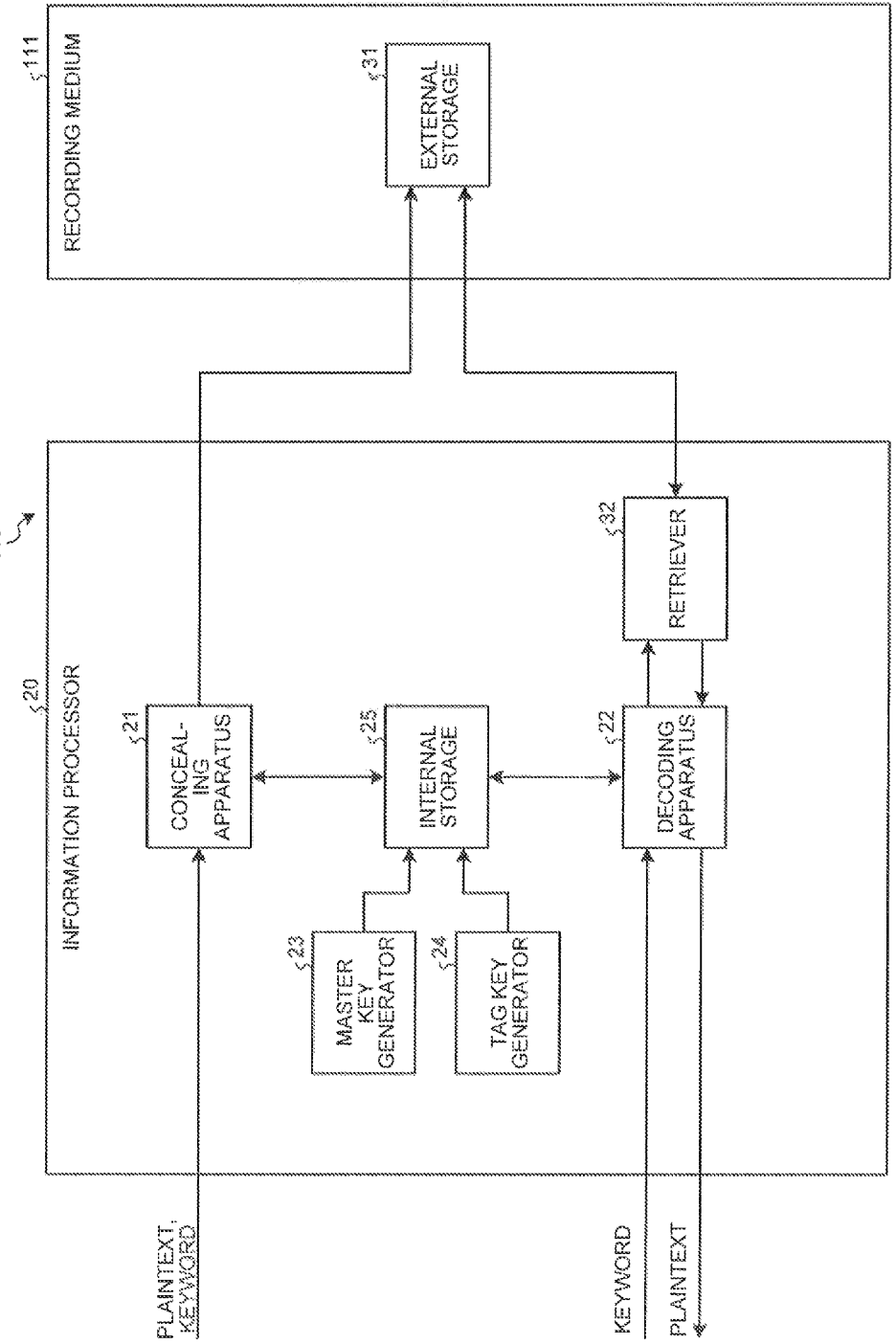
FIG. 15 is a schematic illustrating a configuration of a retrieval system according to a second embodiment.

FIG. 15 is a schematic illustrating a configuration of a retrieval system 110 according to a second embodiment. Because the second embodiment has substantially the same function and configuration as those according to the first embodiment, the members having substantially the same functions and configurations as those in the first embodiment are assigned with the same reference numerals, and detailed explanations thereof, except for their differences, are omitted herein. The same can be said to a third and subsequent embodiments.

The retrieval system 110 according to the second embodiment includes the information processor 20 and a recording medium 111. The information processor 20 according to the embodiment includes the retriever 32. The recording medium 111 includes the external storage 31.

The recording medium 111 is, for example, a compact disc (CD), a digital versatile disc (DVD), a secure digital (SD) memory card, a universal serial bus (USB) memory, or a removable hard disk drive (HDD). The recording medium 111 is mounted on a computer or the like including the information processor 20 connected to the internal network. The retriever 32 is implemented by a computer or the like in the internal network. In this manner, the retrieval system 110 according to the embodiment can store the concealed texts and tags in the recording medium 111.

Third Embodiment

Figure 16:
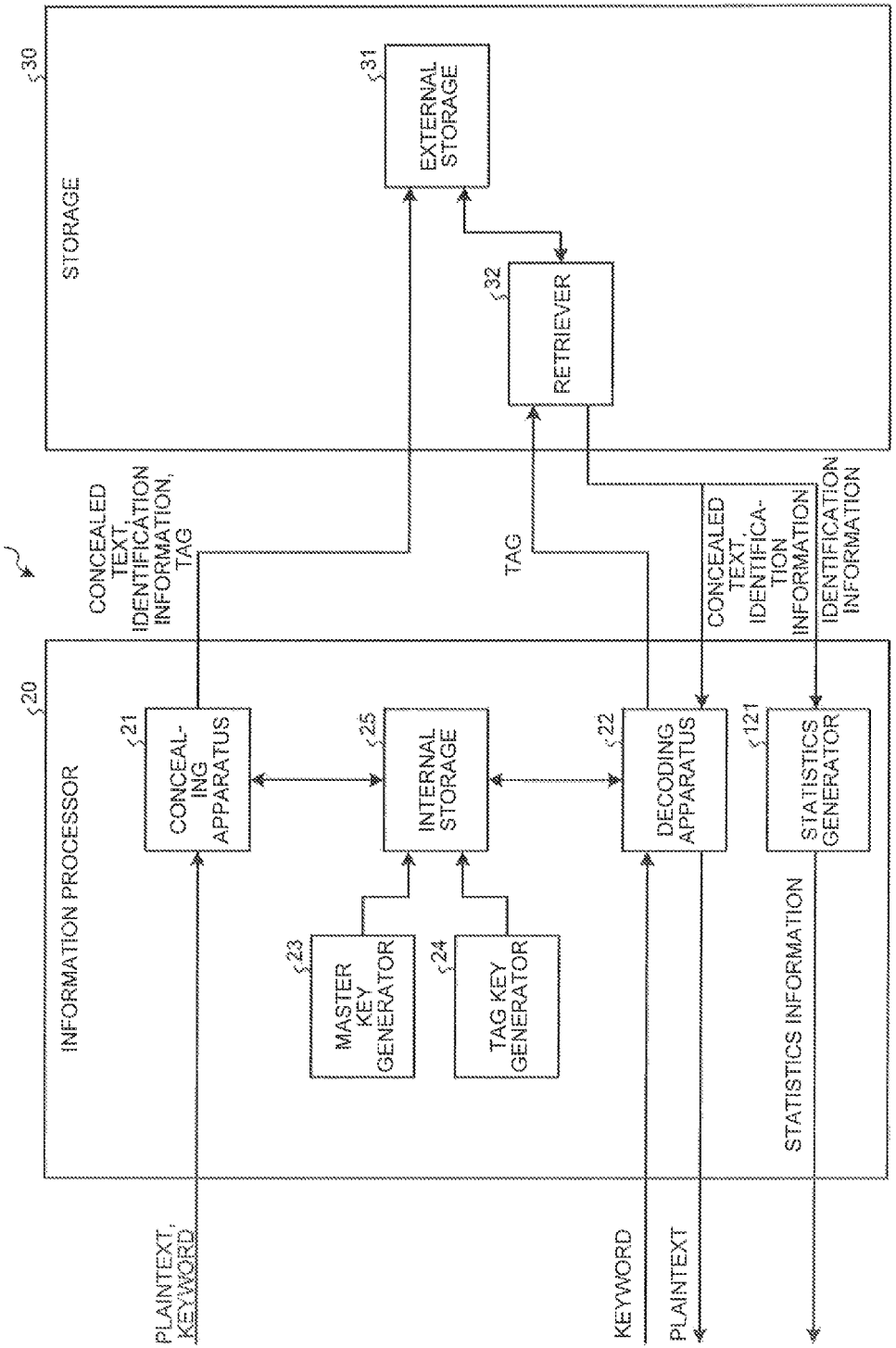
FIG. 16 is a schematic illustrating a configuration of a retrieval system according to a third embodiment.

FIG. 16 is a schematic illustrating a configuration of a retrieval system 120 according to a third embodiment. The information processor 20 in the retrieval system 120 according to the third embodiment further includes a statistics generator 121.

The statistics generator 121 receives an input of a set of pieces of identification information from the pairs of a concealed test and identification information output from the retriever 32. The statistics generator 121 then counts the number of pieces of identification information mapped to the tag generated by the decoding apparatus 22, and outputs the statistical information corresponding to the keyword. For example, the statistical information may be information related to the number of concealed texts, or information related to the size of the numbers of concealed texts mapped to each keyword.

Such a retrieval system 120 according to the embodiment can detect statistical information corresponding to a keyword, without decoding the concealed text. In the embodiment, the decoding apparatus 22 may be configured not to decode the concealed text. In other words, the decoding apparatus 22 may perform the process of generating a tag, and transmitting the tag to the retriever 32, without performing the other processes. In such a case, the statistics generator 121 may not be included in the information processor 20, and included in the storage 30, for example. Furthermore, the configuration according to the embodiment may be implemented with the second embodiment as well.

Fourth Embodiment

Figure 17:
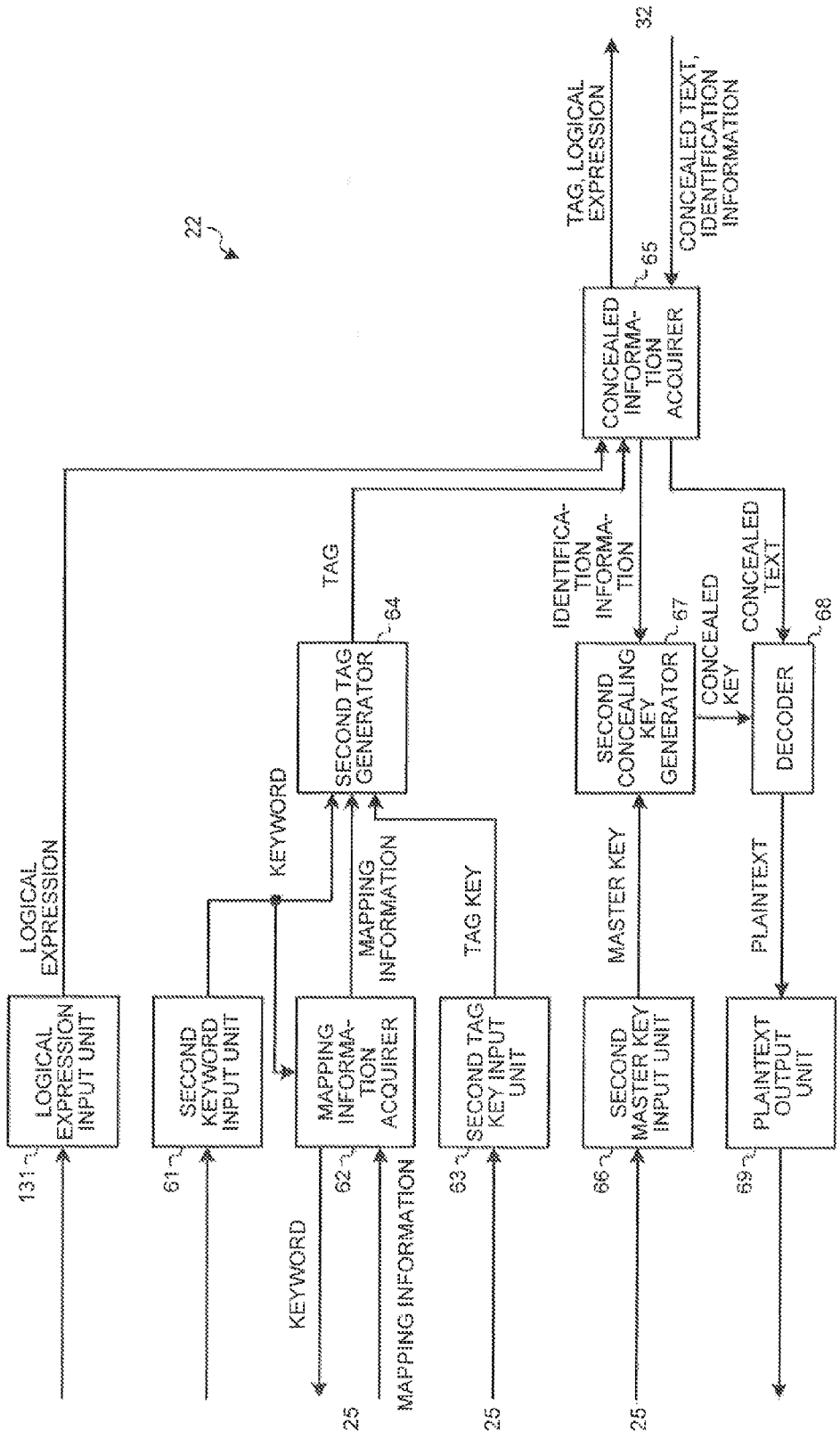
FIG. 17 is a schematic illustrating a configuration of a decoding apparatus according to a fourth embodiment.

FIG. 17 is a schematic illustrating a configuration of a decoding apparatus 22 according to a fourth embodiment. The decoding apparatus 22 according to the fourth embodiment further includes a logical expression input unit 131.

In the embodiment, the second keyword input unit 61 receives an input of one or more keywords. The logical expression input unit 131 receives an input of a logical expression that is input with the one or more keywords received by the second, keyword input unit 61. The mapping information acquirer 62 acquires the mapping information for each of the received one or more keywords. The concealed information acquirer 65 then generates one or more tags for each of the received one or more keywords.

The concealed information acquirer 65 replaces the logical expression that is input with a keyword with another logical expression that is input with a tag generated by the second, tag generator 64. The concealed information, acquirer 65 then outputs the logical, expression to the retriever 32, in addition to the tag for each of the received one or more keywords.

The retriever 32 retrieves from the external storage 31, and extracts a plurality of concealed text and identification information each of which is stored as a pair and that are mapped to each of the tags received, from the concealed information acquirer 65. The retriever 32 then performs the operation of the received logical expression, by receiving an input of the concealed text and identification information paired with the concealed text corresponding to each of the tags. The retriever 32 then outputs a concealed text and identification information as a pair, resulting from the operation of the logical expression to the decoding apparatus 22. The concealed information acquirer 65 then acquires the concealed text and identification information output as a pair from the retriever 32.

In the manner described above, the decoding apparatus 22 according to the embodiment can acquire a result of operation of a logical expression receiving an input of one or more keywords, without decoding the concealed text. The fourth embodiment may be implemented with the second or the third embodiment.

Hardware Configuration

Figure 18:
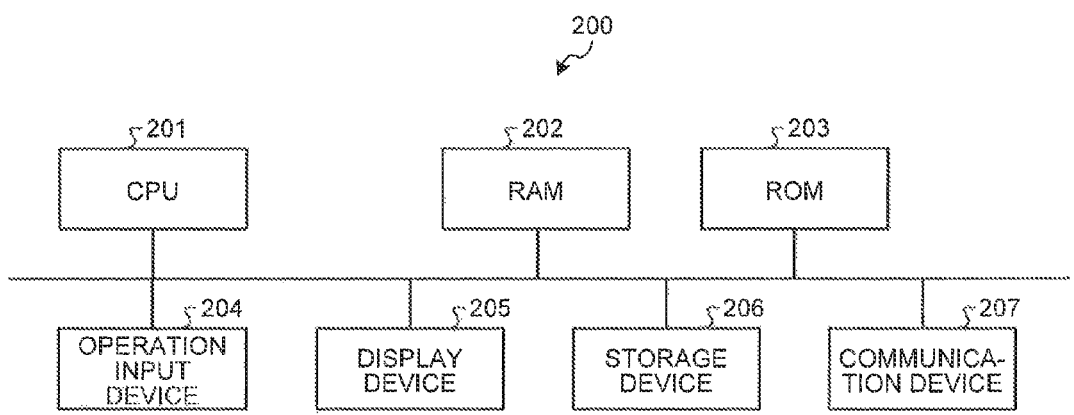
FIG. 18 is a schematic of a hardware configuration of a computer according to the embodiments.

FIG. 18 is a schematic illustrating a hardware configuration of a computer according to the embodiments. The concealing apparatus 21 and the decoding apparatus 22 according to the embodiment are implemented as a computer 200 having the hardware configuration as illustrated in FIG. 18, for example. The computer 200 includes a central processing unit (CPU) 201, a random access memory (RAM) 202, a read-only memory (ROM) 203, an operation input device 204, a display device 205, a storage device 206, and a communication device 207. These devices are connected to one another via a bus.

The CPU 201 is a processor for executing an operation, a control process, and the like, based on computer programs. The CPU 201 executes various processes by cooperating with a computer program stored in the ROM 203, the storage device 206, or the like, using a predetermined area of the RAM 202 as a working area.

The RAM 202 is a memory such as a synchronous dynamic random access memory (SDRAM). The RAM 202 serves as a working area of the CPU 201. The ROM 203 is a memory storing therein a computer program and various types of information unrewritably.

The operation input device 204 is an input device such as a mouse and a keyboard. The operation input device 204 receives information input as a user operation as an instructions signal, and outputs the instructions signal to the CPU 201.

The display device 205 is a display device such as a liquid crystal display (LCD). The display device 205 displays various types of information based on a display signal from the CPU 201.

The storage device 206 is a device for writing and reading data to and from a semiconductor storage medium such as a flash memory, or a storage medium magnetically or optically capable of recording. The storage device 206 writes or reads data to or from the storage medium under the control of the CPU 201. The communication device 207 communicates with an external device over a network under the control of the CPU 201.

The computer program executed by the concealing apparatus 21 according to the embodiments has a modular structure including a plaintext input module, a first keyword input module, a first master key input module, an identification information generating module, a first concealing key generating module, a concealing module, a first tag key input module, a mapping information generating module, a first tag generating module, a concealed information output module, and a keyword output module. By causing the CPU 201 (processor) to load the computer program onto the RAM 202 and execute the computer program, the computer 200 is caused to function as the plaintext input unit 41, the first keyword input unit 42, the first master key input unit 43, the identification information generator 44, the first concealing key generator 45, the concealing processor 46, the first tag key input unit 47, the mapping information generator 48, the first tag generator 49, the concealed information output unit 50, and the keyword output unit 51.

The configuration of the concealing apparatus 21 is not limited to the configuration described above, and at least a part of the plaintext input unit 41, the first keyword input unit 42, the first master key input unit 43, the identification information generator 44, the first concealing key generator 45, the concealing processor 46, the first tag key input unit 47, the mapping information generator 48, the first tag generator 49, the concealed information output unit 50, and the keyword output unit 51 may be implemented as a hardware circuit (for example, an integrated semiconductor circuit).

The computer program executed by the decoding apparatus 22 according to the embodiments has a modular structure including a second keyword input module, a mapping information acquiring module, a second tag key input module, a second tag generating module, a concealed information acquiring module, a second master key input module, a second concealing key generating module, a decoding module, and a plaintext output module. By causing the CPU 201 (processor) to load the computer program onto the RAM 202 and execute the computer program, the computer 200 is caused to function as the second keyword input unit 61, the mapping information acquirer 62, the second tag key input unit 63, the second tag generator 64, the concealed information acquirer 65, the second master key input unit 66, the second concealing key generator 67, the decoder 68, and the plaintext output unit 69.

The configuration of the decoding apparatus 22 is not limited to the configuration described above, and the second keyword input unit 61, the mapping information acquirer 62, the second tag key input unit 63, the second tag generator 64, the concealed information acquirer 65, the second, master key input unit 66, the second concealing key generator 67, the decoder 68 and the plaintext output unit 69 may be, at least partially, implemented as a hardware circuit (such as an integrated semiconductor circuit).

The computer programs executed by the concealing apparatus 21 and the decoding apparatus 22 according to the embodiments are provided, in a manner recorded in a computer-readable recording medium such as a compact disc read-only memory (CD-ROM), a flexible disk, a compact disc recordable (CD-R), or a digital versatile disc (DVD), as a file in a format that is installable or executable on a computer.

The computer programs executed by the concealing apparatus 21 and the decoding apparatus 22 according to the embodiments may be stored in a computer connected to a network such as the Internet, and made available for download over the network. The computer programs executed by the concealing apparatus 21 and the decoding apparatus 22 according to the embodiments may be provided or distributed over a network such as the Internet. The computer programs executed by the concealing apparatus 21 and the decoding apparatus 22 may be provided incorporated in a ROM or the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A concealing apparatus comprising:
   one or more hardware processors configured to:
      generate a concealed text by concealing a plaintext with a concealing key;
      generate mapping information that is mapped to a keyword such that different mapping information is associated with each instance of the same keyword;
      generate a tag based on the keyword and the mapping information; and
      output the concealed text and the tag as a pair to external storage storing a plurality of concealed texts each of which is paired with a tag,
      wherein the tag is transmitted to the external storage when retrieving the concealed text.

2. The apparatus according to claim 1, wherein the one or more hardware processors are further configured to generate a random number unique to each keyword as the mapping information.

3. The apparatus according to claim 1, wherein the one or more hardware processors are further configured to output the keyword and the mapping information as a pair and to store the pair of the keyword and the mapping information in an internal storage that is accessible by a specific privileged user.

4. The apparatus according to claim 1, wherein the one or more hardware processors are further configured to generate identification information for identifying the plaintext, to generate the concealing key based on the identification information, and to output the concealed text, the identification information, and the tag as a set.

5. The apparatus according to claim 4, wherein the one or more hardware processors generate the concealing key based on a master key and the identification information.

6. The apparatus according to claim 5, wherein the one or more hardware processors are further configured to generate the master key from a random number and to generate the concealing key corresponding to the identification information from the master key based on a predetermined key rule, and the concealing key is different for each piece of identification information, and is partly correlated with other concealing key.

7. The apparatus according to claim 6, wherein:
the one or more hardware processors generate n concealed texts by encrypting "n" plaintexts with "n" respective concealing keys, where n is an integer equal to or more than two, all of the n concealing keys have a same bit length, each plaintexts and each concealing key have the same bit length of $|m|$,
the one or more hardware processors input "n" derivation parameters $\rho_{1,y}$ taking a value equal to or more than zero and equal to or less than one and representing security of any one of the plaintexts, the security being specified by a user, assuming that an attacker comes to know the n concealed texts and y concealing keys, where "y" is each of the integers within a range equal to or more than zero and equal to or less than n−1,
the one or more hardware processors calculate differences $d(x)=\rho_{1,x-1}-\rho_{1,x}$ for each value of x, where x is an integer within a range equal to or more than zero and equal to or less than n, $\rho_{1,-1}=1$, and $\rho_{1,n}=0$, and
the one or more hardware processors acquire, for each of the values of x, coefficients $a_{t,x}$ of a polynomial, and output a sequence resulting from combining the acquired coefficients $a_{t,x}$ following a first key rule, the polynomial being expressed as $$\sum_{t=0}^{x-1} a_{t,x} i^t \mod 2^{d(x)*|m|}$$

8. The apparatus according to claim 7, wherein the one or more hardware processors extract the coefficients $a_{t,x}$ of the polynomial expressed as the expression from the master key following the first key rule, acquire a plurality of partial sequences identified by the polynomial and identification information i and the extracted coefficients $a_{t,x}$, and output a sequence resulting from combining the acquired partial sequences following a second key rule, as the concealing key.

9. The apparatus according to claim 1, wherein the one or more hardware processors generate the tag by substituting a tag key, the keyword, and the mapping information into a predetermined function.

10. The apparatus according to claim 1, wherein the one or more hardware processors generates the concealed text by encrypting the plaintext with the concealing key.

11. The apparatus according to claim 1, wherein the one or more hardware processors generates the concealed text including a plurality of shares by secret-sharing the plaintext with the concealing key.

12. The apparatus according to claim 1, wherein the one or more hardware processors generate a plurality of pieces of mapping information for one keyword, and a plurality of tags for the one keyword, based on the pieces of mapping information corresponding to the one keyword.

13. The apparatus according to claim 12, wherein the one or more hardware processors generate a plurality of tags each of which is to be mapped to the one keyword.

14. The apparatus according to claim 12, wherein the one or more hardware processors generate a plurality of tags each of which is enabled to be mapped to a plurality of keywords.

15. A decoding apparatus comprising:
one or more hardware processors configured to:
receive an input of a keyword for retrieving a plaintext;
acquire a piece of mapping information corresponding to the received keyword from internal storage storing a plurality of keywords each of which is paired with a piece of mapping information;
generate a tag based on the received keyword and the piece of mapping information mapped to the received keyword;
transmit the generated tag to external storage storing a plurality of concealed texts each of which is paired with a tag;
acquire a concealed text corresponding to the generated tag from the external storage; and
decode the plaintext from, the concealed text with the concealing key,
wherein the mapping information is generated such that different mapping information is associated with each instance of the same keyword when generating the concealed text.

16. The apparatus according to claim 15, wherein the one or more hardware processors are further configured to retrieve a concealed text paired with the generated tag from the external storage.

17. The apparatus according to claim 15, wherein the concealing key is generated from identification information for identifying the plaintext, the one or more hardware processors acquire the concealed text and the identification information corresponding to the generated tag from the external storage storing a plurality of concealed texts each of which is paired with a piece of identification information and a tag, and the one or more hardware processors are further configured to generate the concealing key based on the acquired identification information.

18. The apparatus according to claim 17, wherein the one or more hardware processors are further configured to calculate statistical information based on number of pieces of identification information corresponding to the generated tag, and to output the statistical information corresponding to the keyword.

19. The apparatus according to claim 17, wherein the one or more hardware processors are further configured to receive an input of one or more keywords, receive an input of a logical expression that receives, as an input, the received one or more keywords, generate the tag for each of the input keywords, perform an operation of the logical expression receiving an input of a plurality of pairs of a concealed text and identification information acquired for each of the keywords from the external storage, and acquire a plurality of pairs of a concealed text and identification information resulting from the operation.

20. A concealing method comprising:
- generating a concealed text by concealing a plaintext with a concealing key;
- generating mapping information that is mapped to a keyword such that different mapping information is associated with each instance of the same keyword;
- generating a tag based on the keyword and the mapping information; and
- outputting the concealed text and the tag as a pair to external storage storing a plurality of concealed texts each of which is paired with a tag,
- wherein the tag is transmitted to the external storage when retrieving the concealed text.

21. A decoding method comprising:
- receiving an input of a keyword for retrieving a plaintext;
- acquiring a piece of mapping information corresponding to the received keyword from internal storage storing a plurality of keywords each of which is paired with a piece of mapping information;
- generating a tag based on the received keyword and the piece of mapping information mapped to the received keyword;
- transmitting the generated tag to external storage storing a plurality of concealed texts each of which is paired with a tag;
- acquiring the concealed text corresponding to the generated tag from the external storage; and
- decoding the plaintext from the concealed text with the concealing key,
- wherein the mapping information is generated such that different mapping information is associated with each instance of the same keyword when generating the concealed text.

* * * * *